United States Patent [19]
Gibson

[11] Patent Number: 6,012,385
[45] Date of Patent: Jan. 11, 2000

[54] CENTRIFUGAL WATERMELON JUICE EXTRACTOR

[76] Inventor: Edwin Gibson, 809 W. Travis, Fredericksburg, Tex. 78624

[21] Appl. No.: 09/119,495

[22] Filed: Jul. 20, 1998

[51] Int. Cl.[7] ....................................................... A23N 1/00
[52] U.S. Cl. ............................................... 99/511; 99/513
[58] Field of Search .............................. 99/495, 509–513; 210/360.1, 380.1, 369; 241/37.5, 92, 282.1; 366/314, 601; 494/36, 43, 56, 58; 426/484, 479, 481, 599, 478–483, 485

[56] References Cited

U.S. PATENT DOCUMENTS

| | | | |
|---|---|---|---|
| 3,855,911 | 12/1974 | Feierabend | 99/511 |
| 4,702,162 | 10/1987 | Sontheimer et al. | 99/495 |
| 5,074,202 | 12/1991 | Sanjuan | 99/511 |
| 5,156,084 | 10/1992 | Lin | 210/380.1 X |
| 5,184,544 | 2/1993 | Ling | 99/495 X |
| 5,222,430 | 6/1993 | Wang | 99/512 |
| 5,257,575 | 11/1993 | Harrison et al. | 99/513 X |
| 5,331,887 | 7/1994 | Beck | 99/495 X |
| 5,392,699 | 2/1995 | Tai | 241/92 X |
| 5,405,096 | 4/1995 | Seol | 241/282.1 |
| 5,408,922 | 4/1995 | Gupta | 99/348 |
| 5,421,248 | 6/1995 | Hsu | 241/37.5 |
| 5,490,453 | 2/1996 | Mackay | 99/495 |

Primary Examiner—Timothy Simone

[57] ABSTRACT

A centrifugal watermelon juice extractor including a main housing having an upper section and a lower section removably coupled together. The upper section has first and second openings through a lower end thereof offset from a center opening thereof. The upper section has a peripheral flange extending upwardly from an interior surface thereof. The peripheral flange contains the first opening interiorly thereof. The second opening is disposed exteriorly of the peripheral flange. The upper section has an angularly disposed ramp secured to an outer surface of the peripheral flange. The ramp has a lower portion disposed over the second opening. A motor is disposed within the lower section of the main housing. A funnel member is removably received within the peripheral flange of the upper section of the main housing and operatively coupling with the motor. The funnel member has a mesh cylindrical side wall. The mesh cylindrical side wall is defined by apertures. The funnel member receives watermelon therein for being squeezed through the mesh cylindrical side wall with juice therefrom collecting within the first container. Seeds from the watermelon are disposed within the second container.

9 Claims, 3 Drawing Sheets

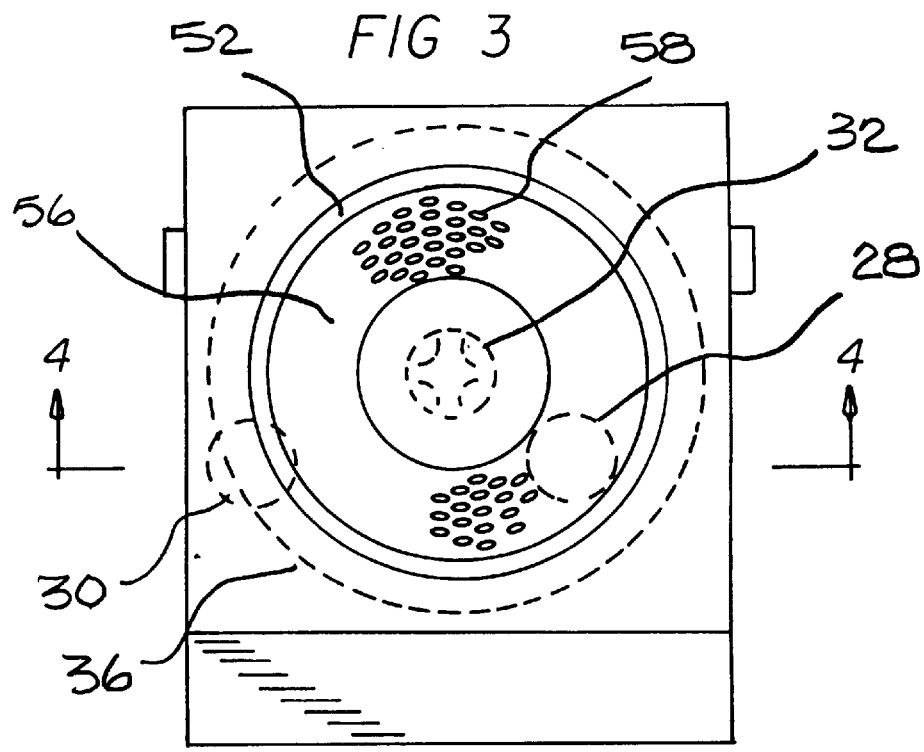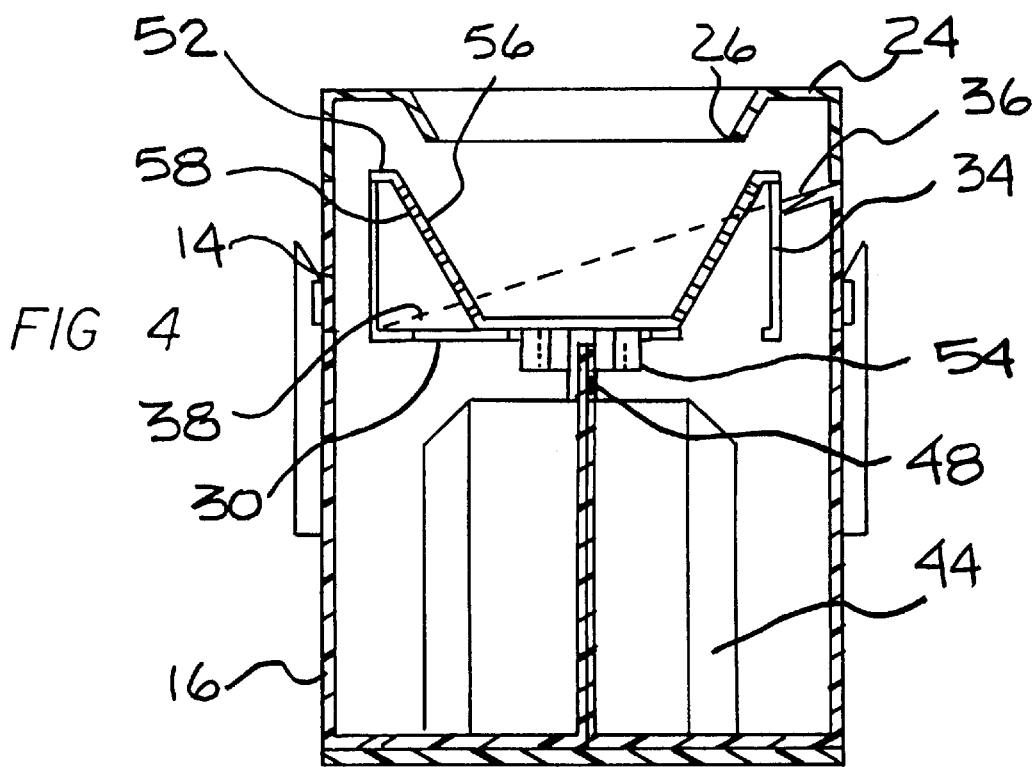

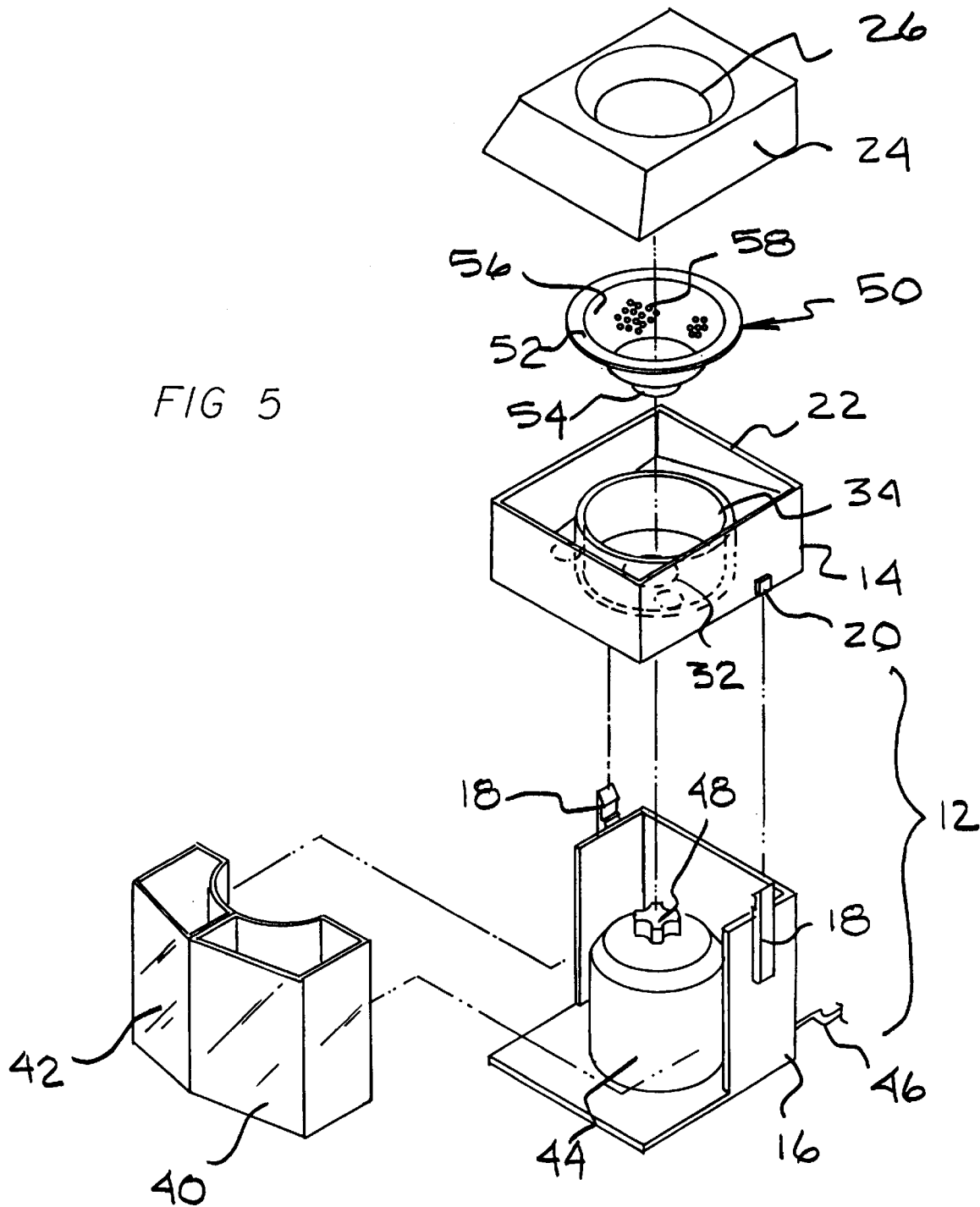

CENTRIFUGAL WATERMELON JUICE EXTRACTOR

BACKGROUND OF THE INVENTION

1. Field of the Invention

The present invention relates to a centrifugal watermelon juice extractor and more particularly pertains to extracting juice from a watermelon and other types of melons, such as honey dews, muskmelons, cantaloupes, etc. and other tropical and citrus fruits for consumption with a centrifugal watermelon juice extractor.

2. Description of the Prior Art

The use of juice extractors is known in the prior art. More specifically, juice extractors heretofore devised and utilized for the purpose of extracting juice from fruits are known to consist basically of familiar, expected and obvious structural configurations, notwithstanding the myriad of designs encompassed by the crowded prior art which have been developed for the fulfillment of countless objectives and requirements.

By way of example, U.S. Pat. No. 1,394,162 to Gebhardt discloses a process of making stock food from cactus; U.S. Pat. No. 2,565,411 to Van Buuren discloses a device for crushing oleiferous seeds and fruit; U.S. Pat. No. 3,855,911 to Feierabend discloses a centrifugal juice extractor; U.S. Pat. No. 5,331,887 to Beck discloses an apparatus for extracting juice from fruits having a rind.

While these devices fulfill their respective, particular objective and requirements, the aforementioned patents do not describe a centrifugal watermelon juice extractor for extracting juice from a watermelon for consumption.

In this respect, the centrifugal watermelon juice extractor according to the present invention substantially departs from the conventional concepts and designs of the prior art, and in doing so provides an apparatus primarily developed for the purpose of extracting juice from a watermelon for consumption.

Therefore, it can be appreciated that there exists a continuing need for new and improved centrifugal watermelon juice extractor which can be used for extracting juice from a watermelon for consumption. In this regard, the present invention substantially fulfills this need.

SUMMARY OF THE INVENTION

In the view of the foregoing disadvantages inherent in the known types of juice extractors now present in the prior art, the present invention provides an improved centrifugal watermelon juice extractor. As such, the general purpose of the present invention, which will be described subsequently in greater detail, is to provide a new and improved centrifugal watermelon juice extractor and method which has all the advantages of the prior art and none of the disadvantages.

To attain this, the present invention essentially comprises a main housing having a generally cylindrical configuration. The main housing had an upper section and a lower section removably coupled together. The lower section has a pair of clamping arms extending upwardly therefrom. Free ends of the clamping arms engage notches formed in the upper section. The upper section has an open upper end. The open upper end has a cover member removably disposed thereover. The cover member has an opening through an upper end thereof. The upper section has first and second openings through a lower end thereof offset from a center opening thereof. The upper section has a peripheral flange extending upwardly from an interior surface thereof. The peripheral flange contains the first opening interiorly thereof The second opening is disposed exteriorly of the peripheral flange. The upper section has an angularly disposed ramp secured to an outer surface of the peripheral flange. The ramp has a lower portion disposed over the second opening. The lower section has a pair of containers removably disposed therein. A first container is positioned below the first opening- in the lower end of the upper section. A second container is positioned below the second opening in the lower end of the upper section. A motor is disposed within the lower section of the main housing. The motor has a power cord extending outwardly of the main housing for coupling with a standard electrical outlet. The motor has a male coupling member extending upwardly therefrom. A funnel member is removably received within the peripheral flange of the upper section of the main housing. The funnel member has an outwardly extending flange for abutting an upper edge of the peripheral flange. The funnel member has a generally conical configuration. The funnel member has a female coupling member extending through the center opening for mating with the male coupling member of the motor. The funnel member has a mesh cylindrical side wall. The mesh cylindrical side wall is defined by circular apertures. The circular apertures each have a diameter of about 1/16 of an inch. The funnel member receives watermelon therein for being squeezed through the mesh cylindrical side wall with juice therefrom collecting within the first container. Seeds from the watermelon are disposed within the second container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved centrifugal watermelon juice extractor which has all the advantages of the prior art juice extractors and none of the disadvantages.

It is another object of the present invention to provide a new and improved centrifugal watermelon juice extractor which may be easily and efficiently manufactured and marketed.

It is a further object of the present invention to provide a new and improved centrifugal watermelon juice extractor which is of durable and reliable construction.

An even further object of the present invention is to provide a new and improved centrifugal watermelon juice extractor which is susceptible of a low cost of manufacture with regard to both materials and labor, and which accordingly is then susceptible of low prices of sale to the consuming public, thereby making such a centrifugal watermelon juice extractor economically available to the buying public.

Even still another object of the present invention is to provide a new and improved centrifugal watermelon juice extractor for extracting juice from a watermelon for consumption.

Lastly, it is an object of the present invention to provide a new and improved centrifugal watermelon juice extractor including a main housing having an upper section and a lower section removably coupled together. The upper section has first and second openings through a lower end thereof offset from a center opening thereof. The upper section has a peripheral flange extending upwardly from an interior surface thereof. The peripheral flange contains the first opening interiorly thereof. The second opening is disposed exteriorly of the peripheral flange. The upper section has an angularly disposed ramp secured to an outer surface of the peripheral flange. The ramp has a lower portion disposed over the second opening. A motor is disposed within the lower section of the main housing. A funnel member is removably received within the peripheral flange of the upper section of the main housing and operatively coupling, with the motor. The funnel member has a mesh cylindrical side wall. The mesh cylindrical side wall is defined by apertures. The funnel member receives watermelon therein for being squeezed through the mesh cylindrical side wall with juice therefrom collecting within the first container. Seeds from the watermelon are disposed within the second container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the present invention as taken along line 3—3 of FIG. 2.

FIG. 4 is a cross-sectional view of the present invention as taken along line 4—4 of FIG. 3.

FIG. 5 is an exploded perspective view of the present invention.

The same reference numerals refer to the same parts through the various figures.

DESCRIPTION OF THE PREFERRED EMBODIMENT

Figure 1:
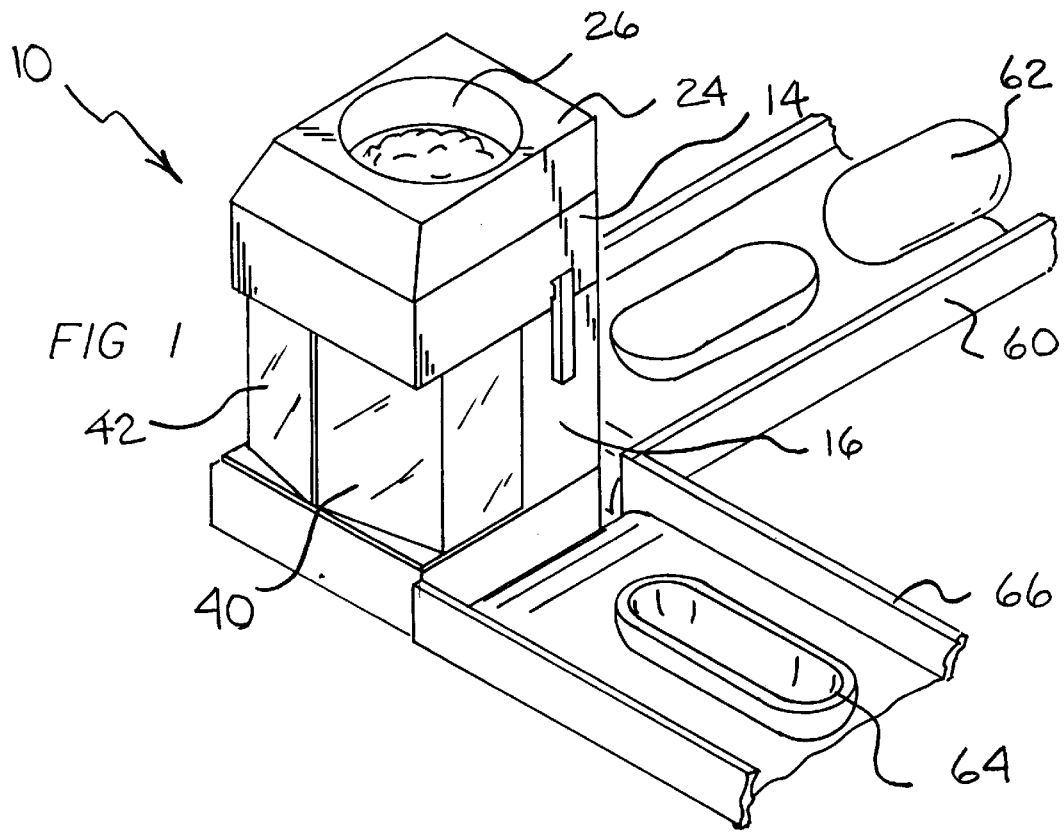
FIG. 1 is a perspective view of the preferred embodiment of the centrifugal watermelon juice extractor constructed in accordance with the principles of the present invention.
Figure 2:
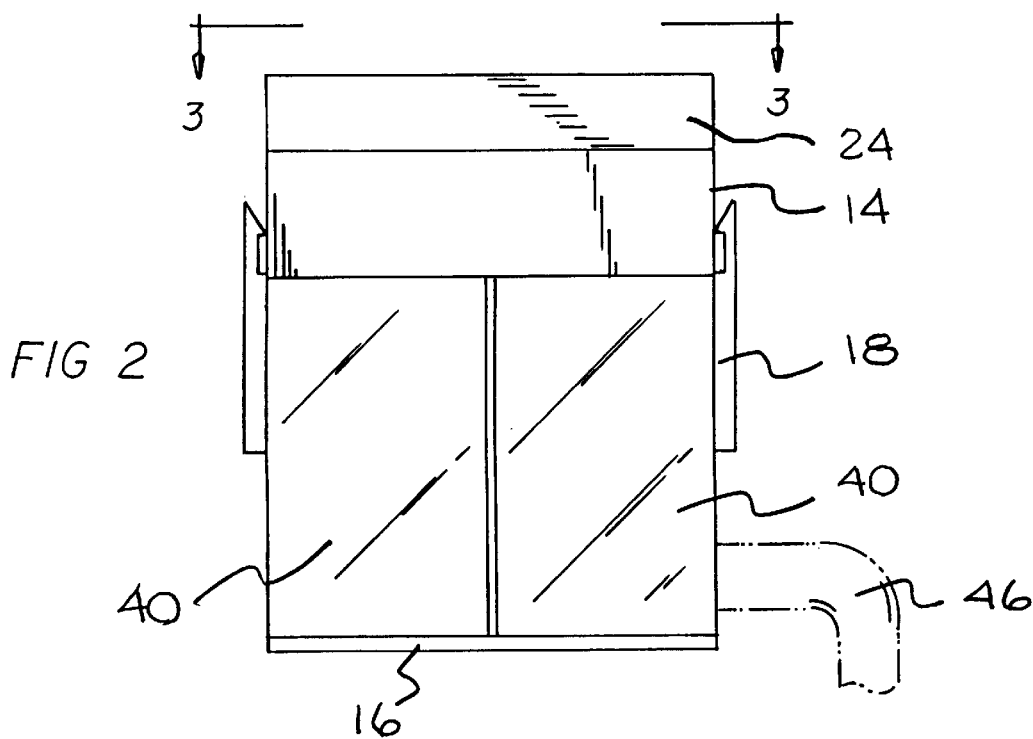
FIG. 2 is a side view of the present invention.

With reference now to the drawings, and in particular, to FIGS. 1 through 5 thereof, the preferred embodiment of the new and improved centrifugal watermelon juice extractor embodying the principles and concepts of the present invention and generally designated by the reference number 10 will be described.

Specifically, it will be noted in the various Figures that the device relates to a centrifugal watermelon juice extractor for extracting juice from a watermelon for consumption. In its broadest context, the device consists of a main housing, a motor, and a funnel member. Such components are individually configured and correlated with respect to each other so as to attain the desired objective.

The main housing 12 has a generally cylindrical configuration. The main housing 12 has an upper section 14 and a lower section 16 removably coupled together. The lower section 16 has a pair of clamping arms 18 extending upwardly therefrom. Free ends of the clamping arms 18 engage notches 20 formed in the upper section 14. The upper section 14 has an open upper end 22. The open upper end 22 has a cover member 24 removably disposed thereover. The cover member 24 has an opening 26 through an upper end thereof. The upper section 14 has first and second openings 28,30 through a lower end thereof offset from a center opening 32 thereof. The upper section 14 has a peripheral flange 34 extending upwardly from an interior surface thereof. The peripheral flange 34 contains the first opening 28 interiorly thereof. The second opening 30 is disposed exteriorly of the peripheral flange 34. The upper section 14 has an angularly disposed ramp 36 secured to an outer surface of the peripheral flange 36. The ramp 36 has a lower portion 38 disposed over the second opening 30. The lower section 16 has a pair of containers removably disposed therein. A first container 40 is positioned below the first opening 28 in the lower end of the upper section 14. A second container 42 is positioned below the second opening 30 in the lower end of the upper section 14. Alternately, a length of hose could be coupled with the first opening 28 in place of the first container 28. A free end of the length of hose could be extended into a larger container or vat to contain a larger quantity of juice. The length of hose would be clear in order to view the cleanliness of the operation.

The motor 44 is disposed within the lower section 16 of the main housing 12. The motor 44 has a power cord 46 extending outwardly of the main housing 12 for coupling with a standard electrical outlet. The motor 44 has a male coupling member 48 extending upwardly therefrom.

The funnel member 50 is removably received within the peripheral flange 34 of the upper section 14 of the main housing 12. The funnel member 50 has an outwardly extending flange 52 for abutting an upper edge of the peripheral flange 34. The funnel member 50 has a generally conical configuration. The funnel member 50 has a female coupling member 54 extending through the center opening 32 for mating with the male coupling member 48 of the motor 44. The funnel member 50 has a mesh cylindrical side wall 56. The mesh cylindrical side wall 56 is defined by circular apertures 58. The circular apertures 58 each have a diameter of about 1/16 of an inch. Alternate sizes of apertures 58 could be used. Square apertures could also be used. The variation of the dimensions of the apertures 58 would vary the amount of pulp from the watermelon mixed in with the extracted juice. The funnel member 50 receives watermelon therein for being squeezed through the mesh cylindrical side wall 56 with juice therefrom collecting within the first container 40. Seeds from the watermelon are disposed within the second container 42. The opening 26 in the cover member 24 allows for the watermelon to be added to the funnel member 50. The motor 44 would cause the funnel member 50 to spin thereby causing the watermelon and the seeds to separate whereby the juice created would dispense through the circular apertures 58 and go through the first opening 28 to be collected within the first container 40. The seeds and pulp from the watermelon would be thrown outwardly of the funnel member 50 during the spinning process and collected on the ramp 36 whereby the angular orientation of the ramp would allow for the seeds and pulp to be dispensed through the second opening 30 and collected within the second container 42.

FIG. 1 illustrates a preferred conveyor system used in association with the present invention. In this system, a first conveyor belt 60 would transport watermelon halves 62 to the device 10 whereupon the interior of the watermelon would be removed and deposited in the device 10 through the opening 26, the rinds 64 would be transported away from the device 10 on a second conveyor belt 66 for disposal or alternate use.

The present invention could also include methods of halving watermelons, removing or scooping out the insides and sending the rind to a separate unit. The insides of the watermelon would be squeezed through the mesh cylindrical side wall 56 to remove the seeds. The seeds could then be utilized for animal feed and the rind for edible substances, such as watermelon rind preserves.

The present invention could also be utilized on other types of melons, such as honey dews, muskmelons, cantaloupes, etc. and other tropical and citrus fruits.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A centrifugal watermelon juice extractor for extracting juice from a watermelon for consumption comprising, in combination:

a main housing having a generally cylindrical configuration, the main housing having an upper section and a lower section removably coupled together, the lower section having a pair of clamping arms extending upwardly therefrom, free ends of the clamping arms engaging notches formed in the upper section, the upper section having an open upper end, the open upper end having a cover member removably disposed thereover, the cover member having an opening through an upper end thereof, the upper section having first and second openings through a lower end thereof offset from a center opening thereof, the upper section having a peripheral flange extending upwardly from an interior surface thereof, the peripheral flange containing the first opening interiorly thereof, the second opening being disposed exteriorly of the peripheral flange, the upper section having an angularly disposed ramp secured to an outer surface of the peripheral flange, the ramp having a lower portion disposed over the second opening, the lower section having a pair of containers removably disposed therein, a first container being positioned below the first opening in the lower end of the upper section, a second container being positioned below the second opening in the lower end of the upper section;

a motor disposed within the lower section of the main housing, the motor having a power cord extending outwardly of the main housing for coupling with a standard electrical outlet, the motor having a male coupling member extending upwardly therefrom;

a funnel member removably received within the peripheral flange of the upper section of the main housing, the funnel member having an outwardly extending flange for abutting an upper edge of the peripheral flange, the funnel member having a generally conical configuration, the funnel member having a female coupling member extending through the center opening for mating with the male coupling member of the motor, the funnel member having a mesh cylindrical side wall, the mesh cylindrical side wall being defined by circular apertures, the circular apertures each having a diameter of about $1/16$ of an inch, the funnel member receiving watermelon therein for being squeezed through the mesh cylindrical side wall with juice therefrom collecting within the first container, seeds from the watermelon being disposed within the second container.

2. A centrifugal juice extractor for extracting juice from a piece of fruit for consumption comprising, in combination:

a main housing having an upper section and a lower section removably coupled together, the upper section having first and second openings through a lower end thereof offset from a center opening thereof, the upper section having a peripheral flange extending upwardly from an interior surface thereof, the peripheral flange containing the first opening interiorly thereof, the second opening being disposed exteriorly of the peripheral flange, the upper section having an angularly disposed ramp secured to an outer surface of the peripheral flange, the ramp having a lower portion disposed over the second opening;

a motor disposed within the lower section of the main housing;

a funnel member removably received within the peripheral flange of the upper section of the main housing and operatively coupling with the motor, the funnel member having a mesh cylindrical side wall, the mesh cylindrical side wall being defined by apertures, the funnel member receiving watermelon therein for being squeezed through the mesh cylindrical side wall with juice therefrom collecting within a first container, seeds from the watermelon being disposed within a second container.

3. The fruit juice extractor as set forth in claim 2 wherein the fruit is watermelon.

4. The fruit juice extractor as set forth in claim 2 wherein the lower section of the main housing has a pair of clamping arms extending upwardly therefrom, free ends of the clamping arms engaging notches formed in the upper section.

5. The fruit juice extractor as set forth in claim 2 wherein the upper section of the main housing has an open upper end, the open upper end has a cover member removably disposed thereover, the cover member has an opening through an upper end thereof.

6. The fruit juice extractor as set forth in claim 2 wherein the lower section has a pair of containers removably disposed therein, a first container being positioned below the first opening in the lower end of the upper section, a second container being positioned below the second opening in the lower end of the upper section.

7. The fruit juice extractor as set forth in claim 2 wherein the motor has a male coupling member extending upwardly therefrom for mating with a female coupling member of the funnel member.

8. The fruit juice extractor as set forth in claim 2 wherein the funnel member has an outwardly extending flange for abutting an upper edge of the peripheral flange.

9. The fruit juice extractor as set forth in claim 2 wherein the apertures of the mesh cylindrical side wall of the funnel member each have a diameter of about $\frac{1}{16}$ of an inch.

* * * * *